United States Patent
Li et al.

(10) Patent No.: US 11,395,330 B2
(45) Date of Patent: Jul. 19, 2022

(54) METHOD AND APPARATUS FOR ADAPTIVE SCHEDULING AND TRANSMISSION

(71) Applicant: Telefonaktiebolaget LM Ericsson (publ), Stockholm (SE)

(72) Inventors: Gen Li, Chaoyang District (CN); Ming Li, Chaoyang District (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 115 days.

(21) Appl. No.: 16/967,251

(22) PCT Filed: Feb. 2, 2019

(86) PCT No.: PCT/CN2019/074641
§ 371 (c)(1),
(2) Date: Aug. 4, 2020

(87) PCT Pub. No.: WO2019/154379
PCT Pub. Date: Aug. 15, 2019

(65) Prior Publication Data
US 2020/0359410 A1    Nov. 12, 2020

Related U.S. Application Data

(63) Continuation of application No. PCT/CN2018/075960, filed on Feb. 9, 2018.

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0048* (2013.01); *H04W 72/1242* (2013.01);
(Continued)

(58) Field of Classification Search
CPC ............. H04W 72/14; H04W 72/1242; H04W 72/1268; H04W 74/0808; H04W 72/08; H04L 5/0048
See application file for complete search history.

(56) References Cited

U.S. PATENT DOCUMENTS

| 2010/0202389 A1* | 8/2010 | Cai ..................... H04W 72/042 370/329 |
| 2014/0126483 A1* | 5/2014 | Novak ................ H04W 72/048 370/329 |

(Continued)

FOREIGN PATENT DOCUMENTS

| CN | 106060935 A | 10/2016 |
| EP | 2343946 A2 | 7/2011 |

(Continued)

OTHER PUBLICATIONS

EPO Communication and Search Report dated Oct. 22, 2021 for patent application No. 19751399.7, consisting of 6—pages.
(Continued)

*Primary Examiner* — Walter J Divito
*Assistant Examiner* — Anthony Luo
(74) *Attorney, Agent, or Firm* — Christopher & Weisberg, P.A.

(57) ABSTRACT

Various embodiments of the present disclosure provide a method for adaptive scheduling and transmission in a communication network. The method comprises receiving two or more uplink grants from a network node to a terminal device. The two or more uplink grants indicate at least granted resource units for the terminal device. The method further comprises selecting an uplink grant from the two or more uplink grants by the terminal device based at least in part on availability of the granted resource units.

14 Claims, 12 Drawing Sheets

(51) Int. Cl.
*H04W 72/12* (2009.01)
*H04W 74/08* (2009.01)
*H04W 72/08* (2009.01)

(52) U.S. Cl.
CPC ... *H04W 72/1268* (2013.01); *H04W 74/0808* (2013.01); *H04W 72/08* (2013.01)

(56) References Cited

U.S. PATENT DOCUMENTS

| | | | |
|---|---|---|---|
| 2016/0192379 A1 | 6/2016 | Behravan et al. | |
| 2016/0211951 A1 | 7/2016 | Park | |
| 2017/0374686 A1* | 12/2017 | Agarwal | H04W 74/0833 |
| 2018/0049065 A1* | 2/2018 | Yoon | H04L 5/0007 |
| 2018/0098223 A1* | 4/2018 | Hugl | H04L 5/0098 |
| 2018/0235025 A1* | 8/2018 | Chen | H04L 5/001 |
| 2018/0324865 A1* | 11/2018 | Hui | H04W 74/006 |
| 2020/0383134 A1* | 12/2020 | Tirronen | H04W 74/0833 |

FOREIGN PATENT DOCUMENTS

| | | |
|---|---|---|
| WO | 2011139068 A2 | 11/2011 |
| WO | 2013167748 A1 | 11/2013 |
| WO | 2016162760 A1 | 10/2016 |
| WO | 2017011137 A1 | 1/2017 |
| WO | 2017028887 A1 | 2/2017 |

OTHER PUBLICATIONS

International Search Report and Written Opinion of the International Searching Authority dated Mar. 27, 2019 issued in PCT Application No. PCT/CN2019/074641, consisting of 7 pages.

* cited by examiner

METHOD AND APPARATUS FOR ADAPTIVE SCHEDULING AND TRANSMISSION

CROSS-REFERENCE TO RELATED APPLICATIONS

This Application is a Submission Under 35 U.S.C. § 371 for U.S. National Stage Patent Application of International Application No.: PCT/CN2019/074641, filed Feb. 02, 2019 entitled "METHOD AND APPARATUS FOR ADAPTIVE SCHEDULING AND TRANSMISSION," which claims priority to International Application No.: PCT/CN2018/075960, filed Feb. 09, 2018, entitled "METHOD AND APPARATUS FOR ADAPTIVE SCHEDULING AND TRANSMISSION," the entireties of both of which are incorporated herein by reference.

FIELD OF THE INVENTION

The present disclosure generally relates to communication networks, and more specifically, to scheduling and transmission in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband may continue to drive some demands for big overall traffic capacity and huge achievable end-user data rates in a wireless communication network. Many use-cases and deployment scenarios for network services may require data rates of up to 10 Gbps. These demands for very high system capacity and end-user data rates can be met by networks where distances between access nodes may range from a few meters in indoor deployments up to roughly 50 meters in outdoor deployments, for example, by next generation communication networks with an infrastructure density considerably higher than the densest networks of today. Besides the traditional licensed spectrum bands, the next generation communication networks such as fifth generation (5G) and new radio (NR) networks are also expected to be operable in the unlicensed spectrum bands which may be sharable. On the other hand, radio devices in the next generation communication networks are expected to operate with multiple antennas to obtain beamforming gain. Thus, it is desirable to improve scheduling of multi-antenna transmissions in the sharable spectrum bands to enhance the system performance of a communication network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The wide transmission bandwidths needed to provide high data rates such as 10 Gbps and above may be obtained through spectrum allocations in the centimeter and millimeter-wave bands. High-gain beamforming, typically realized with array antennas, can be used to mitigate the increased pathloss at higher frequencies and benefit from spatial reuse. In a wireless communication network which can support operations on the sharable spectrum bands, a terminal device such as a user equipment (UE) may not be able to achieve multi-antenna gain effectively, because some radio resources scheduled for the UE may be occupied by other device and the UE cannot transmit data to the network in time. Therefore, there may be a need to schedule data transmissions in a communication network in a more efficient way.

Various embodiments of the present disclosure propose a solution of adaptive scheduling and transmission in a communication network, which may enable a terminal device to obtain two or more resource configuration options from a network node to schedule uplink (UL) data transmissions adaptively, so as to improve system performance and energy efficiency of the communication network.

According to a first aspect of the present disclosure, there is provided a method performed by a terminal device. The method comprises receiving two or more UL grants from a network node. The two or more UL grants indicate at least granted resource units for the terminal device. The method further comprises selecting an UL grant from the two or more UL grants based at least in part on availability of the granted resource units.

In accordance with an exemplary embodiment, the two or more UL grants may be related to at least one of the follows: a transmission quality estimation for the terminal device by the network node; and transmission capability of the terminal device which is configured with two or more transmitter chains.

In accordance with an exemplary embodiment, the availability of the granted resource units may be determined by the terminal device through performing corresponding listen-before-talk (LBT) procedures for the granted resource units.

In accordance with an exemplary embodiment, the method according to the first aspect of the present disclosure may further comprise transmitting data from the terminal device to the network node according to the selected UL grant.

In accordance with an exemplary embodiment, the method according to the first aspect of the present disclosure may further comprise switching at least one of the two or more transmitter chains from operating with a first granted resource unit to operating with a second granted resource unit according to the selected UL grant, in response that the first granted resource unit is unavailable while the second granted resource unit is available.

In accordance with an exemplary embodiment, the method according to the first aspect of the present disclosure may further comprise adjusting, at a predefined switch point, a data transmission through the at least one of the two or more transmitter chains.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a receiving module and a selecting module. In accordance with some exemplary embodiments, the receiving module is operable to carry out at least the receiving step of the method according to the first aspect of the present disclosure. The selecting module is operable to carry out at least the selecting step of the method according to the first aspect of the present disclosure.

According to a fifth aspect of the present disclosure, there is provided a method performed by a network node. The method comprises determining two or more UL grants indicating at least granted resource units for a terminal device. The method further comprises transmitting the two or more UL grants to the terminal device.

In accordance with an exemplary embodiment, the two or more UL grants may be determined according to at least one of the follows: a transmission quality estimation for the terminal device by the network node; and transmission capability of the terminal device which is configured with two or more transmitter chains.

In accordance with an exemplary embodiment, the method according to the fifth aspect of the present disclosure may further comprise checking a data transmission status of the terminal device. The data transmission status may indicate whether the granted resource units for the terminal device are used for data transmissions of the terminal device.

In accordance with an exemplary embodiment, the method according to the fifth aspect of the present disclosure may further comprise determining a decoding scheme for data transmitted from the terminal device to the network node, based at least in part on the data transmission status. The decoding scheme may be corresponding to an UL grant selected by the terminal device from the two or more UL grants.

In accordance with an exemplary embodiment, the method according to the fifth aspect of the present disclosure may further comprise decoding the data transmitted from the terminal device to the network node according to the determined decoding scheme.

In accordance with an exemplary embodiment, the method according to the fifth aspect of the present disclosure may further comprise adjusting the determined decoding scheme at a predefined switch point.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a determining module and a transmitting module. In accordance with some exemplary embodiments, the determining module is operable to carry out at least the determining step of the method according to the fifth aspect of the present disclosure. The transmitting module is operable to carry out at least the transmitting step of the method according to the fifth aspect of the present disclosure.

In accordance with an exemplary embodiment, the transmission quality estimation for the terminal device may be based at least in part on reference signals transmitted from the terminal device to the network node for individual candidate resource units of the terminal device through each of the two or more transmitter chains.

In accordance with an exemplary embodiment, the transmission capability of the terminal device may be signaled from the terminal device to the network node to indicate the number of transmitter chains of the terminal device and the maximum operation bandwidth per transmitter chain.

In accordance with an exemplary embodiment, the two or more UL grants may comprise at least two UL grants which configure one or more identical granted resource units for the terminal device.

In accordance with an exemplary embodiment, the two or more UL grants may have different priorities.

In accordance with an exemplary embodiment, the two or more UL grants may comprise at least two UL grants which share one or more transmission parameters for the terminal device.

In accordance with an exemplary embodiment, the predefined switch point may be configured by at least one of the terminal device and the network node.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
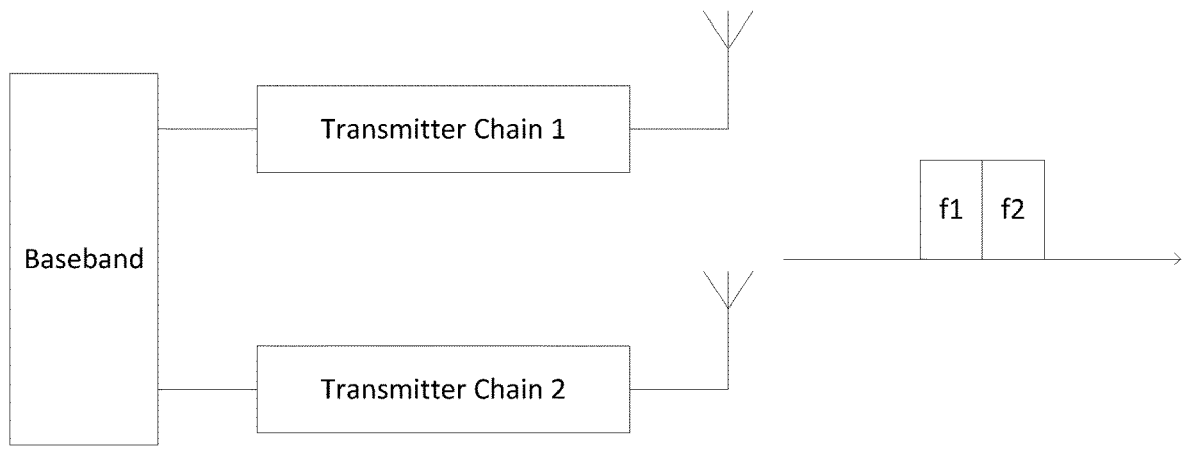
FIG. 1 is a diagram illustrating an exemplary device architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow a wireless communication network such as a NR or 5G system to be operable on the unlicensed bands, besides the licensed bands. By aggregation of licensed and unlicensed carriers, a radio device may benefit from the additional transmission capacity provided by the unlicensed bands.

However, regulatory requirements may not permit transmissions in the unlicensed bands without performing some type of channel sensing. For example, since the unlicensed bands are generally shared with other radios of wireless technologies, a listen-before-talk (LBT) procedure may need to be applied by a communication device before transmitting on a channel that uses the unlicensed bands. LBT mechanism is a flexible way to achieve coexistence support which may enable efficient spectrum sharing among different operators and/or systems. As a distributed mechanism, LBT makes it possible to exchange no information between different coexisting systems.

As mentioned previously, a wireless communication network such as NR or 5G which can support operations on the licensed and/or unlicensed bands may employ multi-antenna technology to obtain more performance gain. Through the use of a number of service antennas which are operated fully coherently and adaptively, the multi-antenna technology such as multiple-input multiple-output (MIMO) transmission can bring prominent improvements in data throughput and energy efficiency.

FIG. 1 is a diagram illustrating an exemplary device architecture according to an embodiment of the present disclosure. The diagram in FIG. 1 may represent a simplified architecture of a terminal device such as a UE which may be equipped with more than one radio frequency (RF) chain to support MIMO transmission in a wireless communication network. For simplicity, the device architecture of FIG. 1 only depicts some exemplary components such as a baseband part and two transmitter chains (denoted as transmitter chain 1 and transmitter chain 2, respectively) configured for the terminal device. In practice, a terminal device according to some embodiments of the present disclosure may further include any additional elements or components suitable to support communication between the terminal device and a network node (such as a gNB) or another terminal device.

As shown in FIG. 1, a transmitter chain of the terminal device may be connected to an antenna deployed at the terminal device to support data transmission. By way of example and not limitation, two operation carriers or channels (denoted as f1 and f2, respectively) may be configured for the data transmission of the terminal device. According to an exemplary embodiment, the bandwidth of f1 or f2 may be just the maximum operation bandwidth of a transmitter chain (e.g. transmitter chain 1 or transmitter chain 2) of the terminal device. In this case, transmitter chain 1 may be configured to operate in f1 or f2 to transmit data of the terminal device. Similarly, transmitter chain 2 also may be configured to operate in f1 or f2. According to an exemplary embodiment, f1 and f2 may be different bandwidth parts (BWPs) provisioned by the network.

In accordance with an exemplary embodiment where UL MIMO transmission technology is applied, a UE having the device architecture as illustrated in FIG. 1 may send sounding reference signals (SRSs) in operation carriers through different ports to make a network node such as a gNB know channel conditions of the UE. For example, the SRSs from the UE may be used by the gNB to estimate the UL channel quality at different frequencies. According to the results of the channel estimation for the UE, the gNB can efficiently assign radio resources for UL data transmission of the UE.

Based at least in part on the results of channel estimation for the UE, the gNB can determine a transmission scheme indicating, for example, rank or precoding determination for UL MIMO transmission of the UE. Then, the gNB may send an UL grant to the UE to schedule the UL MIMO transmission of the UE. The UL grant may comprise some scheduling configurations for the UE, for example, resource allocation, transmission parameters such as a rank indicator (RI) or a precoding matrix indicator (PMI), etc. Correspondingly, the UE may transmit the UL data according to the UL grant received from the gNB. In the case that the UL data transmission of the UE is operated in the unlicensed band such as 5 GHz band, the UE may perform a LBT procedure in each granted channel (for example, 20 MHz channel) and then transmit the UL data in one or more channels where the corresponding LBT procedures are successful.

As agreed in 3GPP, a wireless communication network such as NR or 5G can support wide bandwidth (such as 100 MHz) operations. However, a UE may not need to be capable of operating in the whole wide frequency band. For example, the RF bandwidth for a low end UE may be only 20 MHz. On the other hand, the UE may be configured with more than one RF chain (such as transmitter/receiver chain) for MIMO transmission, as shown in FIG. 1. In this case, it may be needed to consider the influence of the RF bandwidth and the RF chain number of the UE in the design of UL MIMO transmission with respect to the UE.

In accordance with an exemplary embodiment where a UE has two RF chains with only 20 MHz instantaneous bandwidth (IBW) capability, a gNB may schedule the UL MIMO transmission of the UE just in one 20 MHz channel with rank 1 or rank 2 according to different channel statuses of the UE. However, if the UL MIMO transmission of the UE is configured in the sharable spectrum band such as the unlicensed band, the scheduled channel for the UE may be occupied by another UE and thus the UE cannot use the scheduled channel to transmit its UL data in time. Therefore, it may be desirable to introduce an effective solution to schedule UL data transmission in the sharable spectrum band efficiently.

In the proposed solution according to some exemplary embodiments, a radio device (such as a network node or a terminal device) may be operable in the sharable spectrum bands (such as the licensed and/or unlicensed bands). Optionally, the radio device may be configured with two or more antennas or RF chains. According to some exemplary embodiments, the proposed solution can enable a network node such as a gNB to configure more than one UL grant to a terminal device such as a UE, so that the terminal device can select a proper UL grant for UL data transmission, for example, adaptive to availability of one or more granted resource units (such as channels or BWPs) for the terminal device. In this way, the flexibility of data transmission may be increased, and the system performance and the energy efficiency may be improved.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
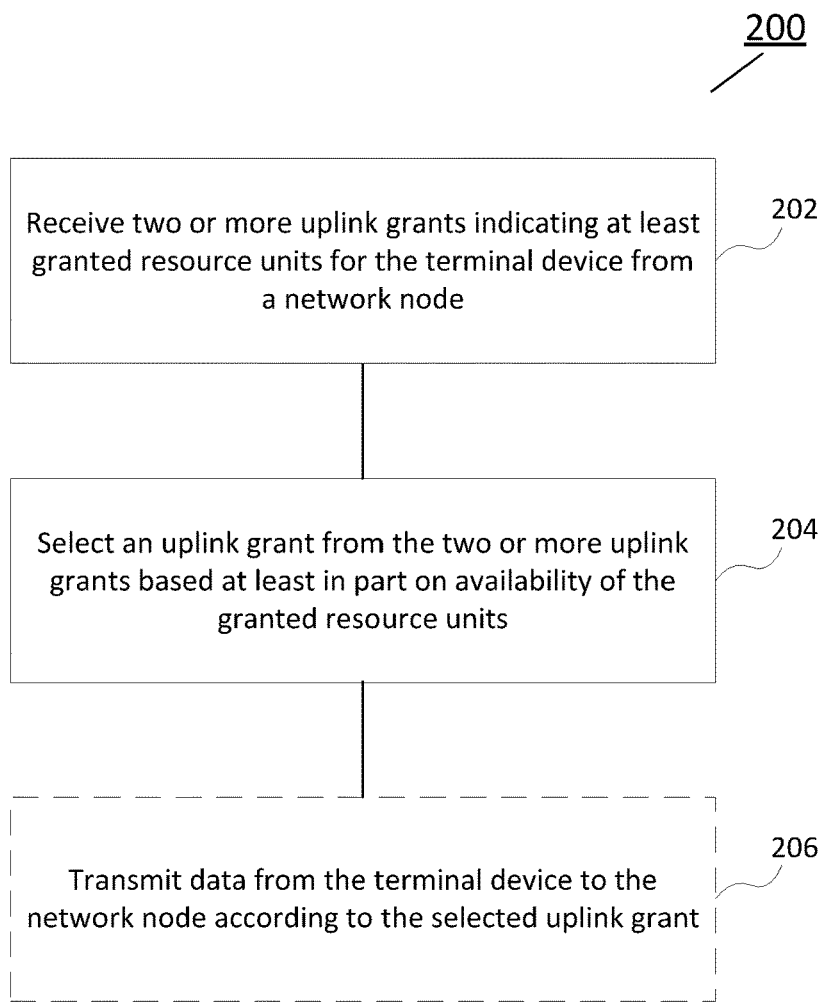
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by a terminal device or an apparatus communicatively coupled to the terminal device. In accordance with an exemplary embodiment, the terminal device such as a UE can support data transmission (such as UL MIMO transmission) in the sharable spectrum band such as the unlicensed band. It will be appreciated that some embodiments of the present disclosure also may be applicable for other use cases, for example, operations in the licensed band which may be shared by the terminal device with one or more other terminal devices.

According to the exemplary method 200 illustrated in FIG. 2, the terminal device may receive two or more UL grants indicating at least granted resource units for the terminal device from the network node, as shown in block 202. The granted resource units for the terminal device may comprise a set of resource elements within a time duration/frequency span and/or one or more antenna ports. For example, these resource units may comprise one or more channels or BWPs granted for the terminal device by the network node. Optionally, the two or more UL grants may further indicate the corresponding transmission parameters such as RIs or PMIs configured for the terminal device by the network node.

In accordance with an exemplary embodiment, the two or more UL grants may be related to at least one of the follows: a transmission quality estimation for the terminal device by the network node; and transmission capability of the terminal device which is configured with two or more transmitter chains. The transmission capability of the terminal device may comprise RF chain capability such as RF chain number and RF bandwidth limit of the terminal device. For example, some physical properties of the two or more transmitter chains may at least partly reflect the RF chain capability of the terminal device.

In accordance with an exemplary embodiment, the transmission capability of the terminal device may be signaled from the terminal device to the network node to indicate the number of transmitter chains of the terminal device and the maximum operation bandwidth per transmitter chain. For example, the terminal device such as a UE may send its RF chain capability related information to the network node such as a gNB. The UE capability related information may be included implicitly in a UE category/class message, or explicitly signaled in a radio resource control (RRC) signaling. Taking the UE which has the device architecture of FIG. 1 as an example, the gNB may learn from the UE capability related information that the UE has two RF chains and each of them can be operated in f1 or f2.

In accordance with an exemplary embodiment, the transmission quality estimation for the terminal device may be based at least in part on reference signals transmitted from the terminal device to the network node for individual candidate resource units of the terminal device through each of the two or more transmitter chains. For example, the terminal device may be configured by the network node to perform SRS transmissions for the candidate resource units of the terminal device. The configuration of the SRS transmissions may indicate the terminal device to use each transmitter chain to transmit reference signals for individual candidate resource units (such as f1 and f2) of the terminal device to the network node. According to the reference signals, the network node can estimate the transmission quality such as channel quality of the terminal device.

Based at least in part on the transmission quality estimation for the terminal device and/or the transmission capability of the terminal device, the network node can determine the two or more UL grants as scheduling options for the terminal device. In accordance with an exemplary embodiment, the two or more UL grants may comprise at least two UL grants which share one or more transmission parameters for the terminal device. For example, if channel conditions of f1 and f2 are similar and thus the same or similar transmission parameter such as a modulation and coding scheme (MCS) value can be configured for data transmissions using f1 and f2, then different UL grants configuring f1 and f2 for the terminal device can share the same MCS value in transmission configurations for f1 and f2.

In accordance with an exemplary embodiment, the two or more UL grants may comprise at least two UL grants which configure one or more identical granted resource units for the terminal device. In this case, although different sets of granted resource units may be configured for the terminal device by the at least two UL grants (such as two UL grants corresponding to Options I and II shown in FIG. 3A and FIG. 3B, respectively), these sets of granted resource units may contain at least one identical granted resource unit (such as f1) for the terminal device.

Figure 3A:
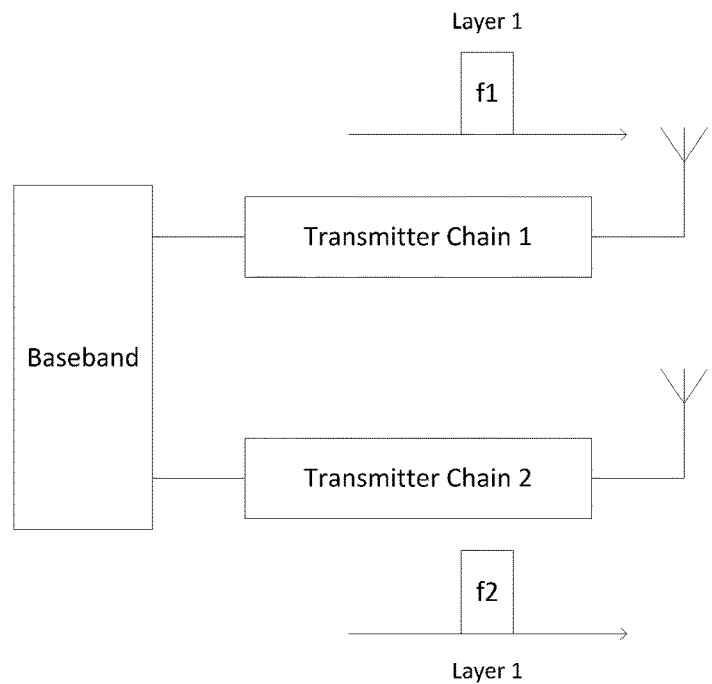
FIGS. 3A-3C are diagrams respectively illustrating three exemplary scheduling options according to some embodiments of the present disclosure.
Figure 3B:
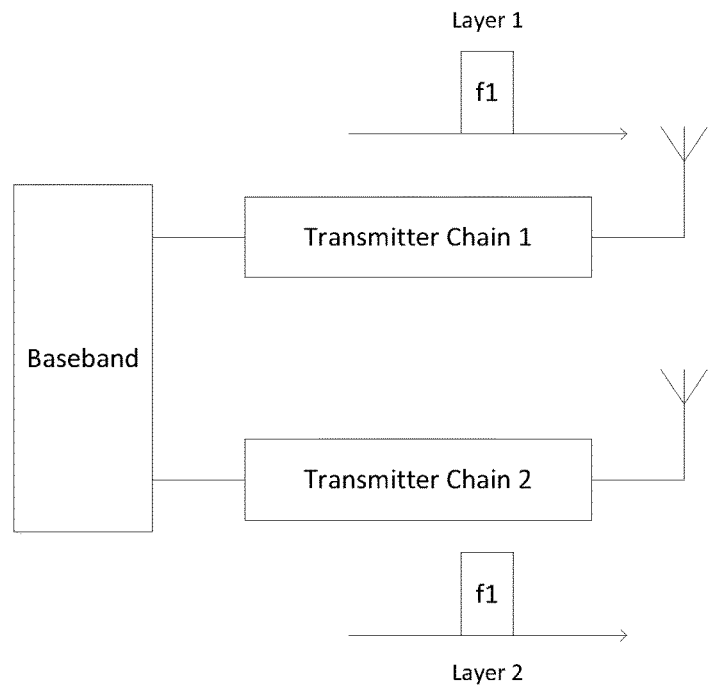
Figure 3C:
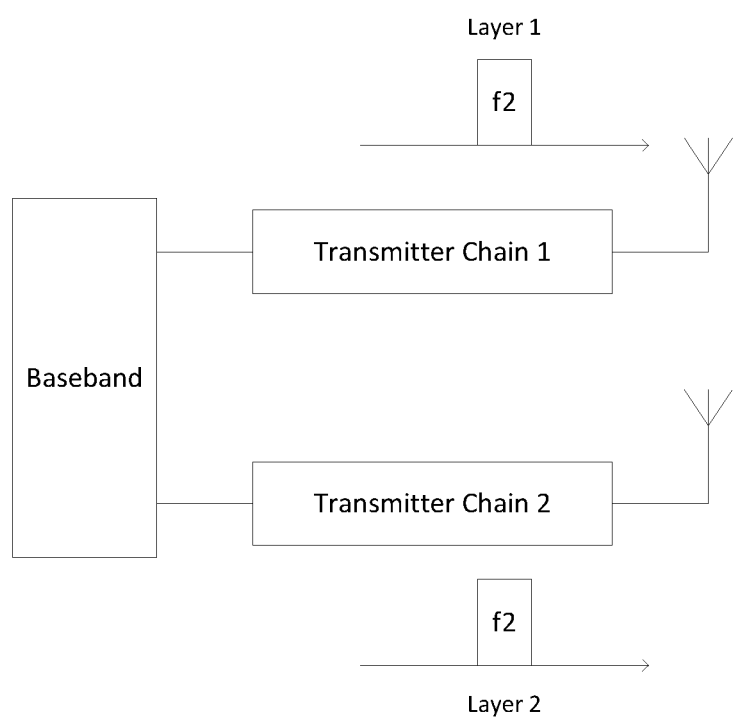

FIGS. 3A-3C are diagrams respectively illustrating three exemplary scheduling options according to some embodiments of the present disclosure. The exemplary scheduling options shown in FIGS. 3A-3C, which are respectively denoted as Option I, Option II and Option III herein, may be provided to a terminal device (such as a UE having the device architecture as illustrated in FIG. 1) by a network node such as a gNB through different UL grants for the terminal device.

According to Option I as illustrated in FIG. 3A, a UE may be scheduled to use transmitter chain 1 and transmitter chain 2 to transmit UL data respectively in resource units f1 and f2 granted by a gNB. In this case, the UE can perform rank 1 MIMO transmissions to the gNB, for example, through the corresponding layer 1 transmissions in the granted resource units f1 and f2.

Alternatively or additionally, the UE can obtain an UL grant corresponding to Option II as illustrated in FIG. 3B from the gNB, which may indicate the UE to use transmitter chain 1 and transmitter chain 2 to transmit UL data just in the granted resource unit f1. According to Option II, the UE can perform rank 2 MIMO transmissions to the gNB, for example, through layer 1 and layer 2 transmissions in the granted resource unit f1.

Similarly, the UE also may be scheduled according to Option III as shown in FIG. 3C to perform rank 2 MIMO transmissions to a gNB, for example, through layer 1 and layer 2 transmissions in the granted resource unit f2, so that the UL data of the UE can be transmitted to the gNB just in the granted resource unit f2.

It will be appreciated that the scheduling options and the corresponding transmission configurations in FIGS. 3A-3C are just shown as examples, and more or less alternative scheduling options and transmission configurations may be provisioned by the UL grants applicable to the terminal device according to the embodiments of the present disclosure.

Referring back to FIG. 2, according to the exemplary method 200, the terminal device can select an UL grant from the two or more UL grants based at least in part on availability of the granted resource units, as shown in block 204. In accordance with an exemplary embodiment, the terminal device may select such an UL grant that the granted resource units indicated by this UL grant are all determined to be available for UL data transmission of the terminal device. For example, if a UE receives three UL grants from a gNB, for example, corresponding to scheduling options I-III as illustrated in FIGS. 3A-3C, and determines that only the granted resource unit f1 is available, then the UE may select an UL grant corresponding to Option II as illustrated in FIG. 3B.

In accordance with an exemplary embodiment, the two or more UL grants may have different priorities. Accordingly, the priorities of the UL grants may be considered by the terminal device in selection of the UL grant. Considering the scheduling options as illustrated in FIGS. 3A-3B, in the case that an UL grant corresponding to Option I has higher priority than UL grants respectively corresponding to Options II and III, if the granted resource units f1 and f2 are determined to be available for UL data transmission of a UE, the UL grant corresponding to Option I may be selected by the UE for the UL data transmission.

In accordance with an exemplary embodiment, the availability of the granted resource units can be determined by the terminal device through performing corresponding LBT procedures for the granted resource units. For example, the terminal device such as a UE may start different LBT procedures for the granted resource units f1 and f2 respectively via transmitter chain 1 and transmitter chain 2 before the granted time, so as to determine if the granted resource units f1 and f2 are available in the granted time. According to the availability of the granted resource units and optionally the priorities of the UL grants, a proper UL grant may be selected for UL transmission of the UE.

In accordance with an exemplary embodiment, the terminal device may transmit data to the network node according to the selected UL grant, as shown in block 206. For example, if the UL grant corresponding to Option II as shown in FIG. 3B is selected, the terminal device may perform rank 2 MIMO transmissions to the network node through layer 1 and layer 2 transmissions in the granted resource unit f1. In this case, two transmitter chains of the terminal device are both configured to operate in f1. However, it may be possible for the terminal device to initially configure one of the two transmitter chains (such as transmitter chain 2) to perform a LBT procedure for f2. When a result of the LBT procedure indicates that f2 is occupied by another terminal device and thus the terminal device determines to perform rank 2 MIMO transmissions in f1, it may be needed for the terminal device to change transmitter chain 2 from operating in f2 to operating in f1.

In accordance with an exemplary embodiment, the terminal device may switch at least one of the two or more transmitter chains from operating with a first granted resource unit to operating with a second granted resource unit according to the selected UL grant, in response that the first granted resource unit is unavailable while the second granted resource unit is available. Optionally, the terminal device may adjust, at a predefined switch point, a data transmission through the at least one of the two or more transmitter chains. Through an adaptive adjustment of a data transmission through a RF chain, the RF resources of the terminal device can be utilized more efficiently.

According to an exemplary embodiment, the predefined switch point may be configured by at least one of the terminal device and the network node. For example, the terminal device may indicate the predefined switch point to the network node by a switch point indicator contained in a control element (CE) together with UL data of the terminal device. Alternatively or additionally, the network node may include a switch point indicator in each UL grant configuring rank N (where N is equal to or larger than 2) transmissions for the terminal device, so that the terminal device can learn the predefined switch point configured by the network node from the received UL grants.

Figure 4:
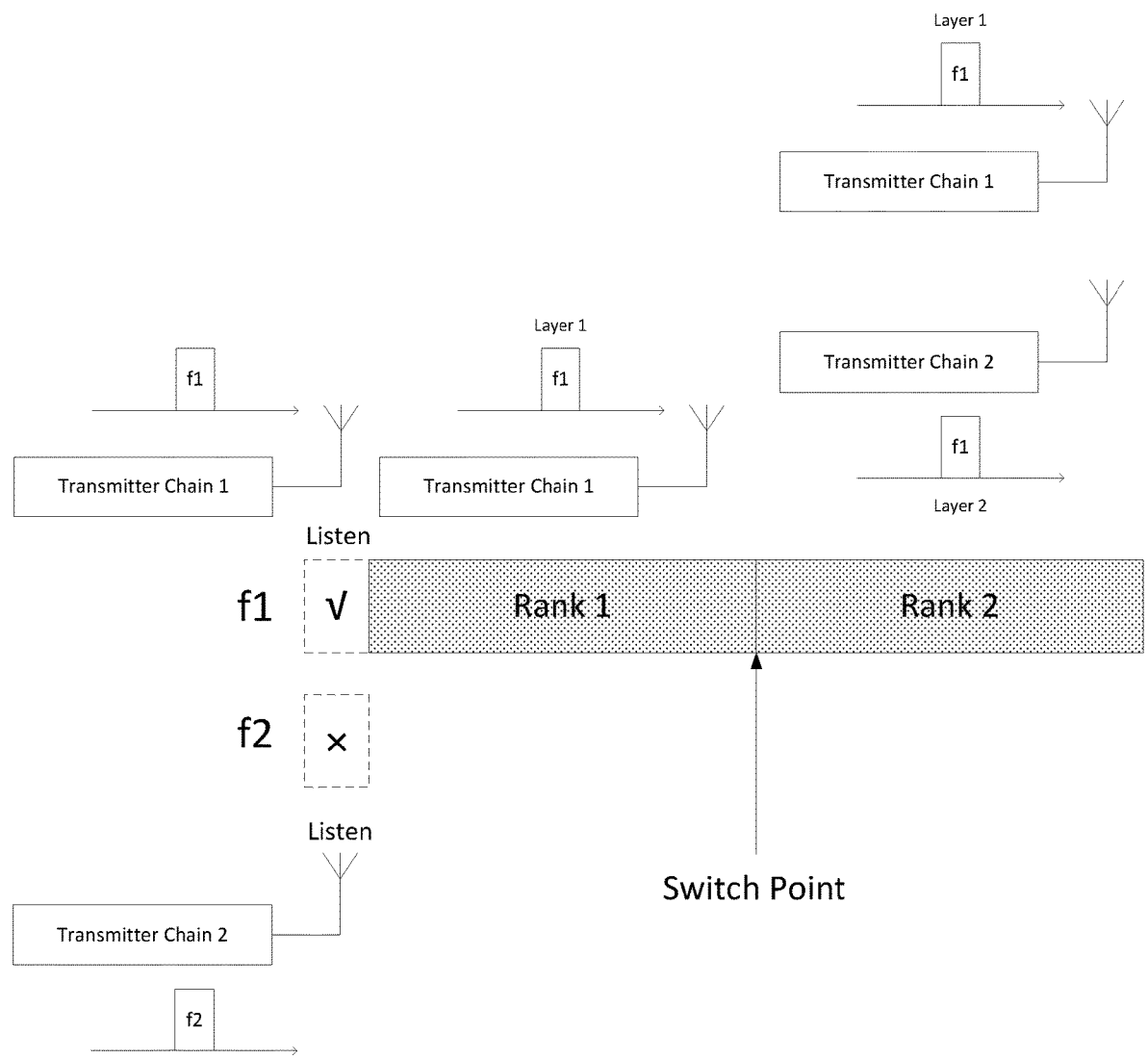
FIG. 4 is a diagram illustrating an exemplary adaptive transmission according to an embodiment of the present disclosure.

FIG. 4 is a diagram illustrating an exemplary adaptive transmission according to an embodiment of the present disclosure. In this embodiment, a terminal device such as a UE may perform corresponding LBT procedures for the granted resource units. For example, the LBT procedure for f1 may be performed through transmitter chain 1, while the LBT procedure for f2 may be performed through transmitter chain 2, as shown in FIG. 4. It will be realized that other suitable transmitter chain configurations also may be applicable to the LBT procedures for the granted resource units of the UE, for example, transmitter chain 1 being configured for the LBT procedure with respect to f2 while transmitter chain 2 being configured for the LBT procedure with respect to f1, etc.

In response to a success of the LBT procedure for f1, the UE may start rank 1 transmission in f1 through transmitter chain 1, regardless of a failure of the LBT procedure for f2. When the UE finds that f2 is not available, it may switch transmitter chain 2 from f2 to f1. Since such RF switch may need a certain period of time, no data would be transmitted by the UE through transmitter chain 2 during this period of time, while the rank 1 transmission is performed in f1 through transmitter chain 1.

In accordance with an exemplary embodiment, the UE may employ an UL MIMO transmission scheme in one or more slots, and employ another UL MIMO transmission scheme after a switch point. For instance, the UE may perform rank 1 transmission in a first slot and then switch, at the switch point, to rank 2 transmissions in a second slot, as shown in FIG. 4. The switch point may be indicated by a gNB in an UL grant for rank 2 transmissions, or indicated by the UE in a medium access control (MAC) CE together with UL data of the UE. According to the indicated switch point, the gNB can adaptively change a decoding scheme applied for the UL data of the UE.

Figure 5:
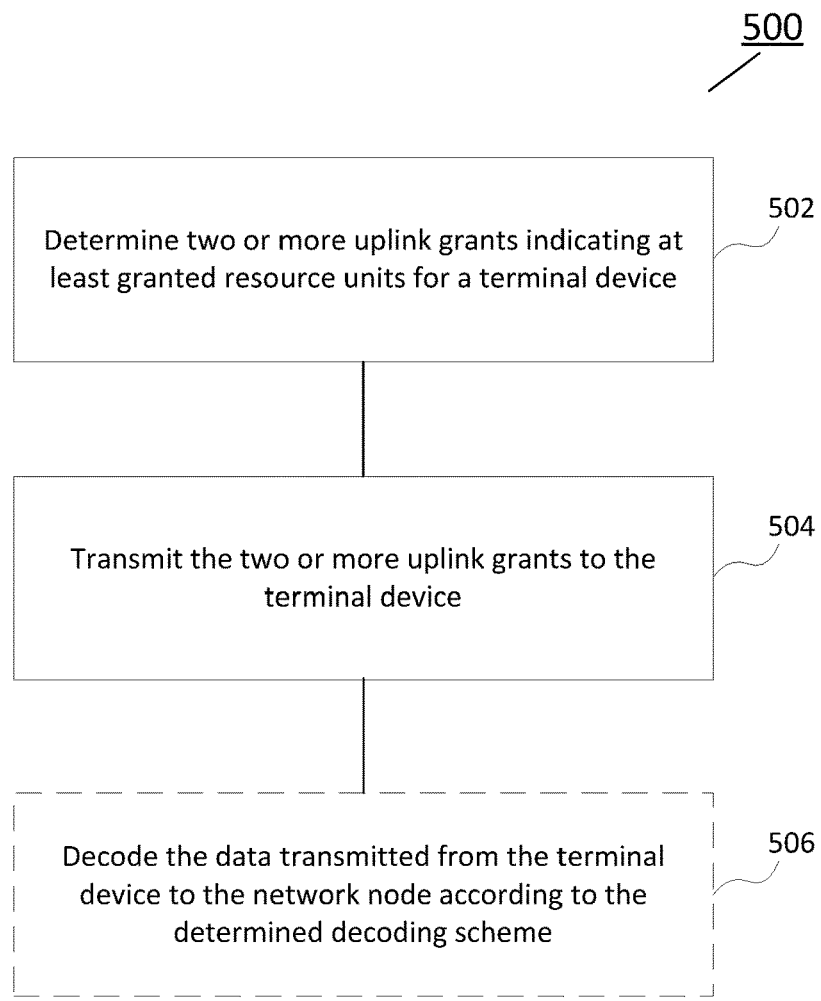
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a network node or an apparatus communicatively coupled to the network node. In accordance with an exemplary embodiment, the network node such as a gNB may configure radio resources in the sharable spectrum bands (such as the licensed band and/or the unlicensed band) for a terminal device such as a UE.

According to the exemplary method 500 illustrated in FIG. 5, the network node can determine two or more UL grants indicating at least granted resource units for the terminal device, as shown in block 502. In accordance with an exemplary embodiment, the two or more UL grants may be determined by the network node according to a transmission quality estimation for the terminal device by the network node, and/or transmission capability of the terminal device which is configured with two or more transmitter chains.

As described in connection with FIG. 2, the transmission capability of the terminal device may be signaled from the terminal device to the network node to indicate the number of transmitter chains of the terminal device and the maximum operation bandwidth per transmitter chain. Optionally, the network node can configure a SRS transmission for each candidate resource unit (such as f1 and f2) with respect to all the transmitter chains of the terminal device. Correspondingly, the network node may receive reference signals transmitted from the terminal device to the network node for individual candidate resource units of the terminal device through each of the two or more transmitter chains. Based at least in part on the received reference signals, the network node can perform the transmission quality estimation for the terminal device. A result of the transmission quality estimation and the transmission capability of the terminal device may influence the UL scheduling configurations of the terminal device and accordingly the determination of the two or more UL grants for the terminal device.

According to the exemplary method 500 illustrated in FIG. 5, the network node may transmit the two or more UL grants to the terminal device, as shown in block 504. As described with respect to FIG. 2, one or more of the same granted resource units may be configured for the terminal device by at least two UL grants among the two or more UL grants. In accordance with an exemplary embodiment, one or more transmission parameters (such as a MCS value or other potential parameters) of the terminal device may be shared by at least two UL grants among the two or more UL grants. Optionally, the two or more UL grants may have different priorities. This enables the terminal device to consider the priorities of the received UL grants in addition to the availability of the granted resource units when selecting an UL grant from the two or more UL grants. The priorities may be predefined by the network node and/or the terminal device.

In accordance with an exemplary embodiment, the network node may check a data transmission status of the terminal device. The data transmission status may indicate whether the granted resource units for the terminal device are used for data transmissions of the terminal device. For example, a gNB may check an UL data transmission status of a UE to determine whether the UE has UL data in the granted channel f1 and/or the granted channel f2.

Based at least in part on the data transmission status, the network node can determine a decoding scheme for data transmitted from the terminal device to the network node. In accordance with an exemplary embodiment, the decoding scheme may correspond to an UL grant selected by the terminal device from the two or more UL grants. Considering the scheduling options illustrated in FIGS. 3A-3C, for example, if the network node finds that there is no UL data of the terminal device in f2, the network node would know that an UL grant selected by the terminal device is corresponding to Option II as shown in FIG. 3B. As such, the network node can determine some parameters and settings of the decoding scheme for the UL data of the terminal device according to the UL grant selected by the terminal device, for example, based at least in part on the resource allocation and transmission parameters configured by the selected UL grant.

In accordance with an exemplary embodiment, the network node can decode the data transmitted from the terminal device to the network node according to the determined decoding scheme, as shown in block 506. Optionally, the network node may adjust the determined decoding scheme at a predefined switch point. In accordance with an exemplary embodiment, the predefined switch point may be indicated in an UL signaling message and/or an UL grant. The adjustment of the decoding scheme by the network node may be adaptive to the adjustment of the data transmission by the terminal device as illustrated in FIG. 4, which can enable the network node to handle the UL data of the terminal device more effectively and flexibly.

It will be realized that parameters, variables and settings related to the scheduling and transmission described herein are just examples. Other suitable network settings, the associated configuration parameters and the specific values thereof may also be applicable to implement the proposed methods.

The proposed solution according to one or more exemplary embodiments can enable a network node such as a gNB to provide two or more UL grants to a terminal device such as a UE. By using the two or more UL grants, for example, the gNB can schedule UL MIMO transmissions (such as rank 1 or rank 2 transmission) with different granted resource units for the UE adaptively, based at least in part on RF limitations at the UE side. On the other hand, the UE can select a proper UL grant from the two or more UL grants according to availability of the granted resource units. Compared to a solution where a single UL grant is provisioned to the UE by the gNB, the proposed solution according to the present disclosure provides the flexibility of selecting an UL grant from multiple UL grants based on different LBT results. As an example, for a single UL grant case, a gNB may schedule a UE to perform rank 2 transmissions in f2 according to Option III shown in FIG. 3C. Then the UE could not transmit any data in the case that f2 is not available. By applying the proposed solution according to the present disclosure, since the UE may receive multiple UL grants, for example, respectively corresponding to Options I-III as illustrated in FIGS. 3A-3C, from the gNB, the UE can select an UL grant corresponding to Option II shown in FIG. 3B and then perform rank 2 transmissions in f1. It can be seen that taking the advantage of the adaptive scheduling and transmission makes the UE able to achieve channel diversity and fully utilize radio resources, so as to improve transmission performance and energy efficiency.

The various blocks shown in FIG. 2 and FIG. 5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
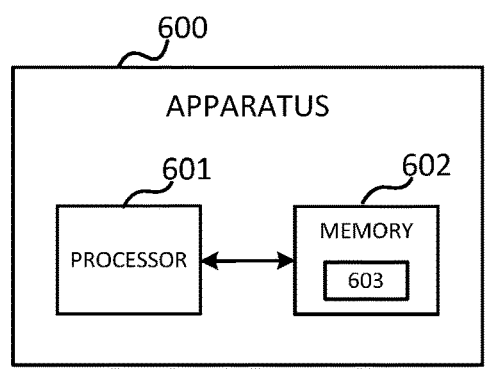
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 2, or a network node as described with respect to FIG. 5. In such case, the apparatus 600 may be implemented as a terminal device as described with respect to FIG. 2, or a network node as described with respect to FIG. 5.

In some implementations, the one or more memories 602 and the computer program codes 603 may be configured to, with the one or more processors 601, cause the apparatus 600 at least to perform any operation of the method as described in connection with FIG. 2. In other implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
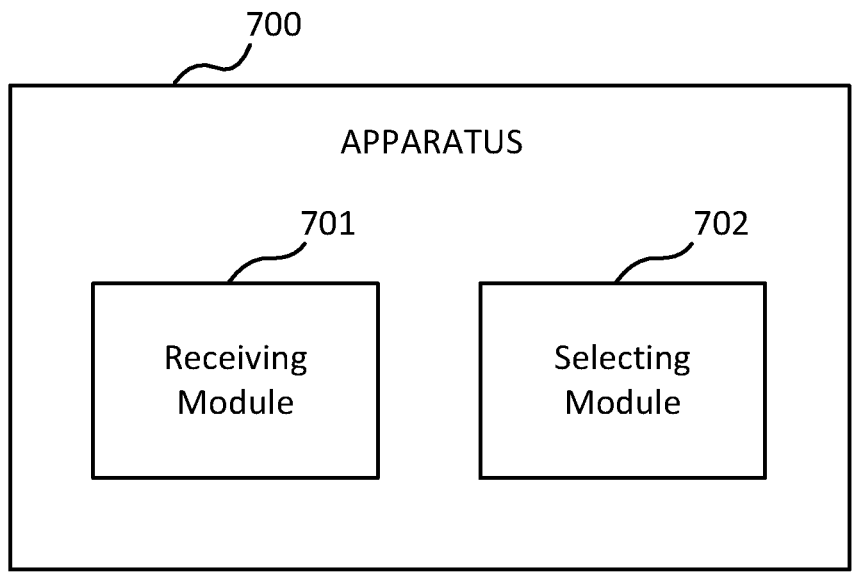
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a receiving module 701 and a selecting module 702. In an exemplary embodiment, the apparatus 700 may be implemented in a terminal device such as a UE. The receiving module 701 may be operable to carry out the operation in block 202, and the selecting module 702 may be operable to carry out the operation in block 204. Optionally, the receiving module 701 and/or the selecting module 702 may be operable to carry out more or less operations to implement the proposed methods according to the exemplary embodiments of the present disclosure.

Figure 8:
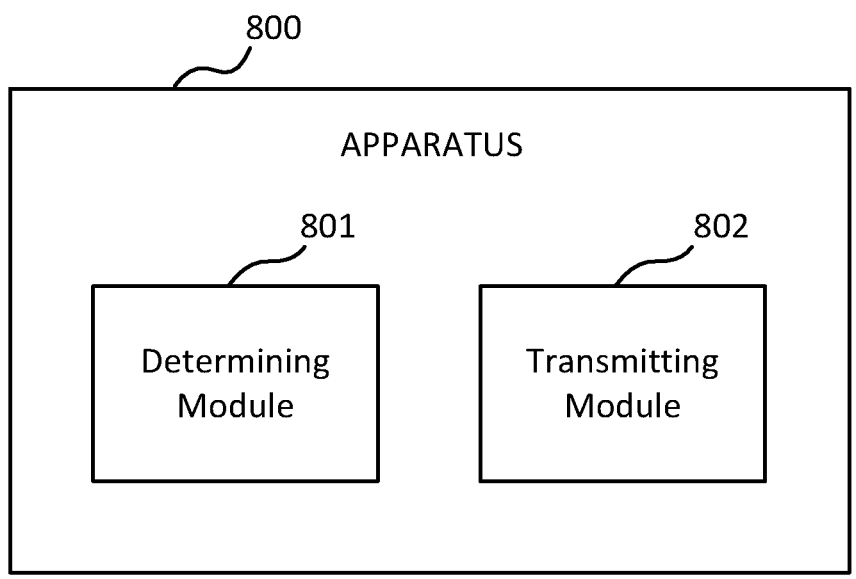
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a determining module 801 and a transmitting module 802. In an exemplary embodiment, the apparatus 800 may be implemented in a network node such as a gNB. The determining module 801 may be operable to carry out the operation in block 502, and the transmitting module 802 may be operable to carry out the operation in block 504. Optionally, the determining module 801 and/or the transmitting module 802 may be operable to carry out more or less operations to implement the proposed methods according to the exemplary embodiments of the present disclosure.

Figure 9:
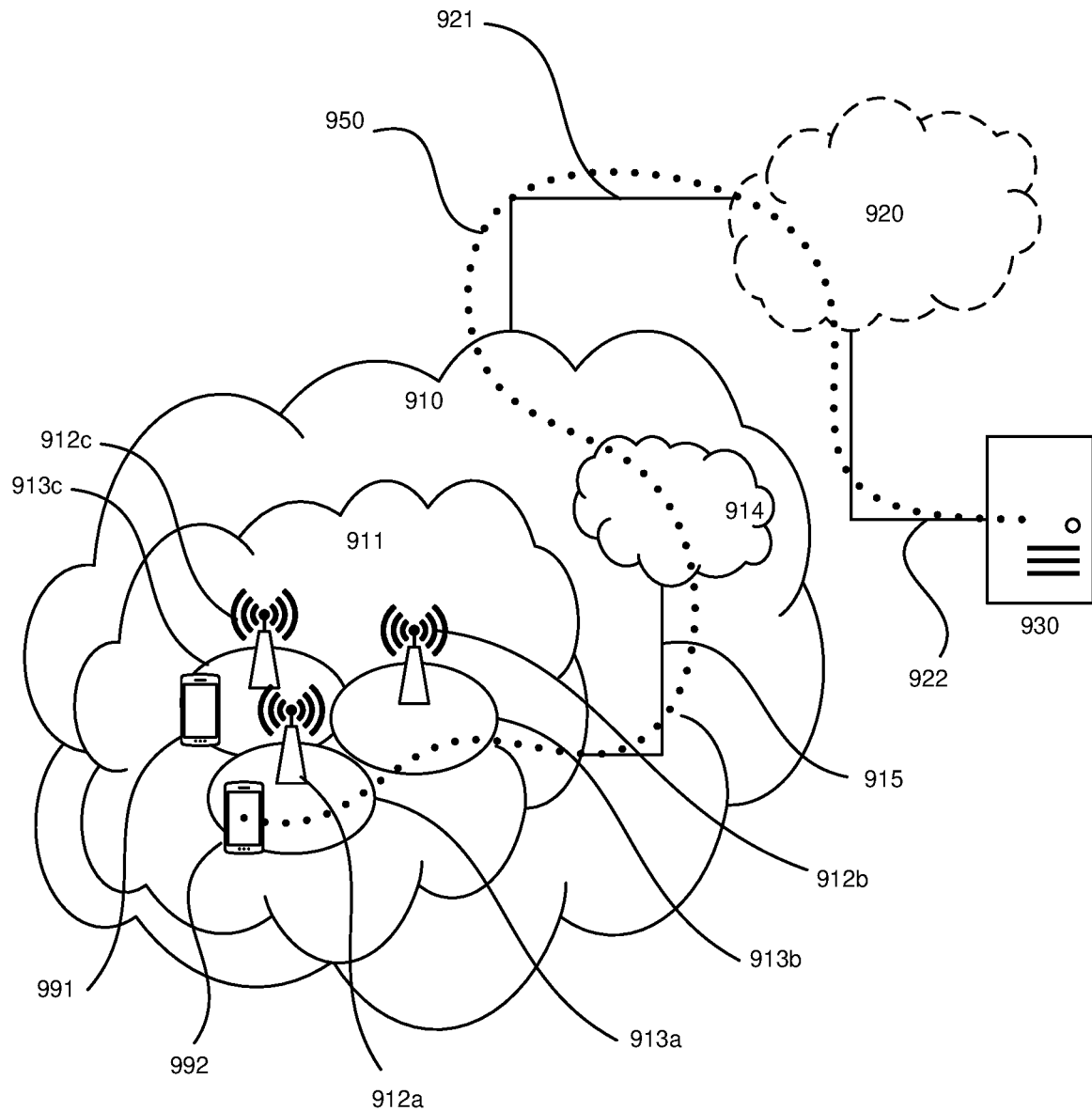
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NB s, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
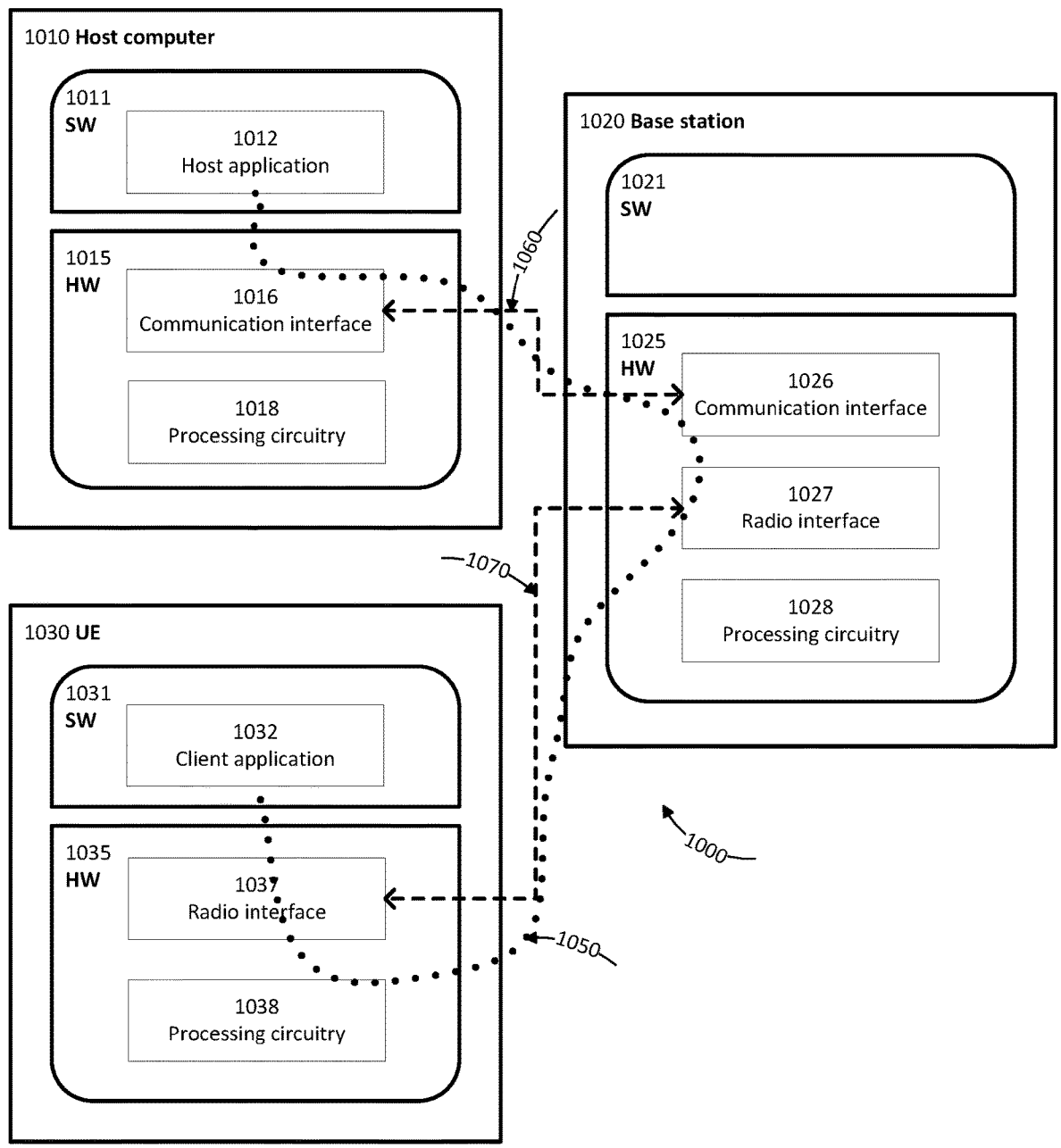
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
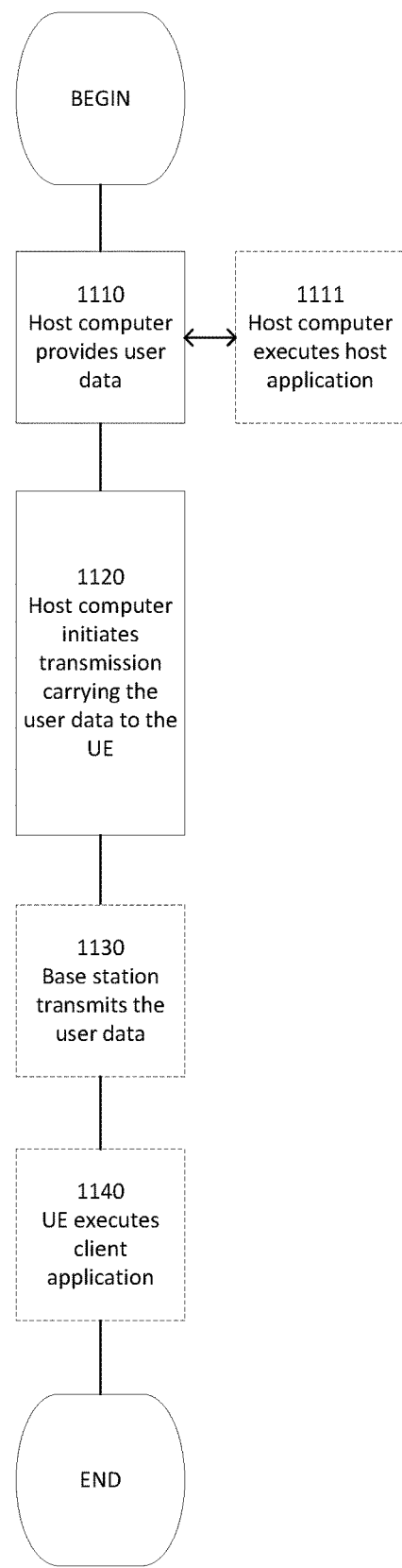
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
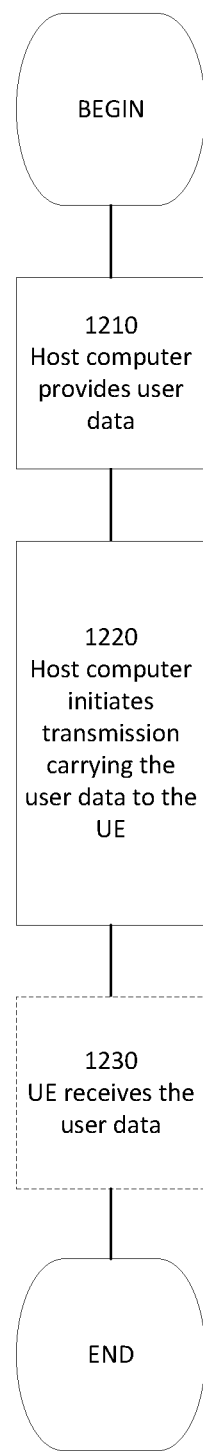
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
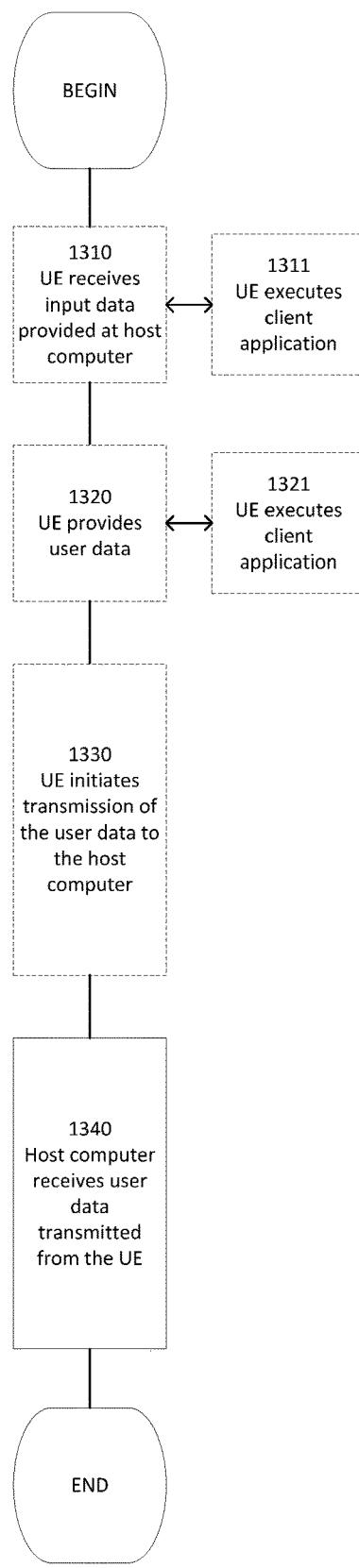
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
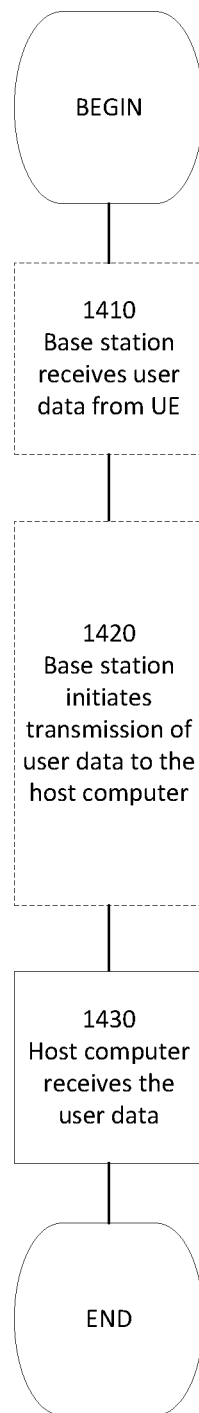
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
   receiving at least two uplink grants indicating at least granted resource units for the terminal device from a network node, the at least two uplink grants related to:
      a transmission quality estimation for the terminal device by the network node, the transmission quality estimation based at least in part on reference signals transmitted from the terminal device to the network node for individual candidate resource units of the terminal device through each of the at least two transmitter chains; and
      a transmission capability of the terminal device which is configured with at least two transmitter chains, the transmission capability of the terminal device being signaled from the terminal device to the network node to indicate a number of transmitter chains of the terminal device and a maximum operation bandwidth per transmitter chain; and
   selecting an uplink grant from the at least two uplink grants based at least in part on availability of the granted resource units.

2. The method according to claim 1, wherein the at least two uplink grants comprise at least two uplink grants which configure at least one identical granted resource unit for the terminal device.

3. The method according to claim 1, wherein the at least two uplink grants have different priorities.

4. The method according to claim 1, wherein the at least two uplink grants comprise at least two uplink grants which share at least one transmission parameter for the terminal device.

5. The method according to claim 1, wherein the availability of the granted resource units is determined by the terminal device through performing corresponding listen-before-talk procedures for the granted resource units.

6. The method according to claim 1, further comprising:
   switching at least one of the at least two transmitter chains from operating with a first granted resource unit to operating with a second granted resource unit according to the selected uplink grant, in response that the first granted resource unit is unavailable while the second granted resource unit is available.

7. A terminal device, comprising:
   at least one processor; and
   at least one memory comprising computer program code;
   the at least one memory and the computer program code configured to, with the at least one processor, cause the terminal device at least to:
      receive at least two uplink grants indicating at least granted resource units for the terminal device from a network node, the at least two uplink grants related to:
         a transmission quality estimation for the terminal device by the network node, the transmission quality estimation based at least in part on reference signals transmitted from the terminal device to the network node for individual candidate resource units of the terminal device through each of the at least two transmitter chains; and
         a transmission capability of the terminal device which is configured with at least two transmitter chains, the transmission capability of the terminal device being signaled from the terminal device to the network node to indicate a number of transmitter chains of the terminal device and a maximum operation bandwidth per transmitter chain; and
      select an uplink grant from the at least two uplink grants based at least in part on availability of the granted resource units.

8. A method performed by a network node, the method comprising:
   determining at least two uplink grants indicating at least granted resource units for a terminal device, the at least two uplink grants related to:
      a transmission quality estimation for the terminal device by the network node, the transmission quality estimation based at least in part on reference signals transmitted from the terminal device to the network node for individual candidate resource units of the terminal device through each of the at least two transmitter chains; and
      a transmission capability of the terminal device which is configured with at least two transmitter chains, the transmission capability of the terminal device being signaled from the terminal device to the network node to indicate a number of transmitter chains of the terminal device and a maximum operation bandwidth per transmitter chain; and
   transmitting the at least two uplink grants to the terminal device.

9. The method according to claim 8, wherein the at least two uplink grants comprise at least two uplink grants which configure at least one identical granted resource unit for the terminal device.

10. The method according to claim 8, wherein the at least two uplink grants have different priorities.

11. The method according to claim 8, wherein the at least two uplink grants comprise at least two uplink grants which share at least one transmission parameter for the terminal device.

12. The method according to claim 8, further comprising:
   checking a data transmission status of the terminal device, wherein the data transmission status indicates whether the granted resource units for the terminal device are used for data transmissions of the terminal device.

13. The method according to claim 12, further comprising:

determining a decoding scheme for data transmitted from the terminal device to the network node, based at least in part on the data transmission status, wherein the decoding scheme is corresponding to an uplink grant selected by the terminal device from the at least two uplink grants.

14. A network node, comprising:

at least one processor; and at least one memory comprising computer program code;

the at least one memory and the computer program code configured to, with the at least one processor, cause the network node at least to:

determine at least two uplink grants indicating at least granted resource units for a terminal device, the at least two uplink grants related to:

a transmission quality estimation for the terminal device by the network node, the transmission quality estimation based at least in part on reference signals transmitted from the terminal device to the network node for individual candidate resource units of the terminal device through each of the at least two transmitter chains; and a transmission capability of the terminal device which is configured with at least two transmitter chains, the transmission capability of the terminal device being signaled from the terminal device to the network node to indicate a number of transmitter chains of the terminal device and a maximum operation bandwidth per transmitter chain; and transmit the at least two uplink grants to the terminal device.

* * * * *